(12) United States Patent
Wissler et al.

(10) Patent No.: US 6,223,526 B1
(45) Date of Patent: May 1, 2001

(54) DUAL COMPARTMENT FUEL STORAGE TANK

(75) Inventors: Gerhard Wissler, Sünching; Günther Pajonk, Zapfendorf; Manfred Weigl, Viehhausen; Lothar Hofmann, Altenkunstadt, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/471,293

(22) Filed: Dec. 24, 1999

Related U.S. Application Data

(63) Continuation of application No. PCT/DE98/01639, filed on Jun. 17, 1998, now abandoned.

(51) Int. Cl.$^7$ ...................................................... F01N 3/00
(52) U.S. Cl. ................... 60/286; 60/283; 60/295; 220/562; 220/23.87; 220/564; 220/905
(58) Field of Search ..................... 60/286, 283, 295, 60/324, 303; 220/562, 4.14, 905, 723, 23.87, 564

(56) References Cited

U.S. PATENT DOCUMENTS

| | | | |
|---|---|---|---|
| 3,583,593 | * 6/1971 | Merritt | 220/63 A |
| 3,827,238 | 8/1974 | Hayashi . | |
| 4,852,761 | * 8/1989 | Turner et al. | 220/85 VR |
| 4,946,659 | 8/1990 | Held et al. . | |
| 4,964,531 | * 10/1990 | Caniglia et al. | 220/855 |
| 5,221,021 | * 6/1993 | Danna | 220/563 |
| 5,305,908 | * 4/1994 | Otto et al. | 220/564 |
| 5,547,096 | * 8/1996 | Kleyn | 220/4.14 |

FOREIGN PATENT DOCUMENTS

| | | | |
|---|---|---|---|
| 3501094 | 7/1986 | (DE) . | |
| 3830045 | 12/1992 | (DE) . | |
| 9308772 | 9/1993 | (DE) . | |
| A20233681 | * 1/1987 | (EP) | 220/4.14 |
| 4358716 | 12/1992 | (JP) . | |

OTHER PUBLICATIONS

"SiNOx Nitrogen Oxide Reduction for Stationary Diesel Engines," Order No. A96001–U91–A232, Siemens AG, Bereich Energieerzeugung (KWU), Freyeslebenstrasse 1, 91058 Erlangen, Germany (1994).
Internationaler Recherchenbericht (International Search Report) in PCT/DE98/01639, Jun. 11, 1998.
International Preliminary Examination Report in PCT/DE98/01639, Oct. 11, 1999.

* cited by examiner

*Primary Examiner*—Thomas Denion
*Assistant Examiner*—Binh Tran
(74) *Attorney, Agent, or Firm*—David M. Quinlan, P.C.

(57) ABSTRACT

A tank for a vehicle having a selective catalytic reduction exhaust gas purification system operating with a reducing agent includes a fuel space for the vehicle fuel and a reducing agent space for the reducing agent. The fuel space and the reducing agent space are combined into a single structural unit that can be fastened as a whole to the vehicle by brackets on the structural unit. This utilizes the limited space available in any vehicle as efficiently as possible and eliminates the need to provide mounting arrangements for separate fuel and reducing agent tanks.

20 Claims, 1 Drawing Sheet

DUAL COMPARTMENT FUEL STORAGE TANK

CROSS-REFERENCE TO RELATED APPLICATIONS

This application is a continuation of International Application PCT/DE98/01639, with an international filing date of Jun. 17, 1998, now abandoned.

BACKGROUND OF THE INVENTION

1. Field of the Invention

The present invention relates to a fuel storage tank, and more particularly, to a fuel storage tank having separate compartments for fuel and a reducing agent.

2. Description of Related Art

Using a reducing agent in an exhaust gas purification system is well known to those skilled in the art. A typical such system is discussed in a Siemens Aktiengesellschaft pamphlet entitled "SiNOx Nitrogen Oxide Reduction for Stationary Diesel Engines," Order No. A96001-U91-A232, Siemens A G, Bereich Energieerzeugung (KWU), Freyeslebenstraβe 1, 91058 Erlangen, Germany (1994). This system is based on the SCR (Selective Catalytic Reduction) method, which makes use of the fact that nitrogen oxides are converted into nitrogen and water in the presence of urea and suitable catalysts. For this purpose, the diesel engine exhaust gases are passed through an SCR catalytic device which is integrated into the engine exhaust line and into which the reducing agent is introduced in a precisely metered manner.

In a vehicle exhaust gas purification system, it is necessary to provide a tank for the reducing agent. Typically, the reducing agent is stored in a separate storage container or tank spaced from the primary vehicle fuel tanks. A solid reducing agent, such as urea, is dissolved in a liquid, for example, water, for various reasons, among them to facilitate its introduction in precisely metered amounts. Such aqueous solutions of reducing agents crystalize and solidify at relatively high temperatures. For example, a 32.5% urea/water solution solidifies at −11° C. (about 14° F.). If the reducing agent solution freezes, it cannot be pumped from the storage tank and used to purify the engine exhaust.

The need to provide for storage of the reducing agent presents particular problems in a vehicle. First, a separate space must be made available in the vehicle. Then, a separate tank must be provided and brackets and other suitable mounting structure must be provided on the tank and in the vehicle to secure the tank within the space. Using vehicle space to accommodate the reducing agent storage tank reduces the amount of space available for other purposes, notably vehicle payload, and requires moving other vehicle components. Accordingly, a great deal of effort must be devoted to designing a storage tank that uses vehicle space as efficiently as possible and that simplifies mounting the storage tank.

SUMMARY OF THE INVENTION

The present invention relates to a structural unit for storing fuel for an internal combustion engine having an exhaust gas purification system, wherein the structural unit includes space for a reducing agent used in the purification system.

It is an object of the invention to provide a fuel container in such a way that its fastening and the fastening of a container for a reducing agent are simplified.

This object is achieved in accordance with the invention by combining the fuel container and the reducing agent container into a structural unit, so that the structural unit can be mounted as a whole to, say, a vehicle, thus simplifying the mounting thereof.

Therefore, the present invention avoids the necessity of mounting an additional tank for the reducing agent by providing an embodiment particularly useful for a vehicle, in which the fuel tank and the reducing agent tank are connected to form a single structural unit which can be fastened as if the two tanks were a single tank. Combining the two hitherto separate tanks makes it possible efficiently to utilize the installation space, which in a vehicle is confined, and mounting becomes particularly simple.

At the same time, the risk that the reducing agent solution will freeze is counteracted because the area of the reducing agent tank walls in direct contact with the ambient surroundings is reduced, as compared with the previous two-tank structure. In addition, the single unit can be constructed so that the fuel in the fuel tank will be in contact with at least one wall of the reducing agent space, or even so that the fuel tank surrounds the reducing agent tank, and heat in the fuel will be transferred to the reducing agent through the contiguous walls. This structure makes it possible to thaw a reducing agent that may have already frozen in its tank.

In furtherance of those and other objects of the present invention, a structural unit for holding fuel for an internal combustion engine having an exhaust gas purification system using a reducing agent comprises a fuel space for holding the fuel, and a reducing agent space for holding the reducing agent, the reducing agent space having at least one common wall with the fuel space, wherein the common wall has a predetermined thermal conductivity promoting heat transfer between the fuel space and the reducing agent space.

BRIEF DESCRIPTION OF THE DRAWINGS

Exemplary embodiments of the invention are explained in more detail below with reference to three figures, of which.

In the drawings, the same components are given the same reference numbers or letters in the different figures.

DETAILED DESCRIPTION OF PREFERRED EMBODIMENTS

Figure 1:
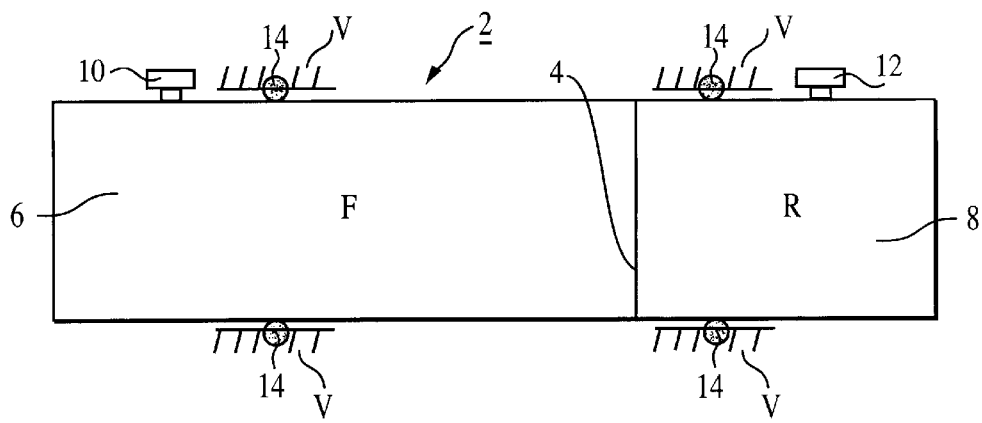
FIG. 1 shows a common housing, in which a reducing agent tank is separated by a partition from an adjacent fuel tank.

According to FIG. 1, a common housing or a structural unit 2 has any suitable configuration, preferably a parallelopiped or cylinder. The housing 2 includes a fixed partition 4 that serves as a common wall dividing the housing into a fuel space 6 for storing a fuel F and a reducing agent space 8 for storing a reducing agent R. At the top of the fuel space a fill/feed pipe 10 provides an opening to the interior of the space 6 to enable it to be filled with fuel or to enable fuel F to be fed to an internal combustion engine (not shown). The top of the reducing agent space 8 has a similar fill/feed pipe 12 that provides an opening for supply and/or discharge of the reducing agent R. The fuel F powers an internal combustion system, in the present embodiment taking the form of diesel fuel for operating a diesel engine in a vehicle. The reducing agent R is injected into an exhaust gas purification system which works on the SCR principle, thus purifying the exhaust gas from the internal combustion system.

Brackets 14 on the structural unit 2 enable it to be mounted to a vehicle V (shown schematically in FIGS. 1–3) in the same manner as would be a single tank. Such brackets and their interaction with cooperating mounting brackets or hangers on an operating unit (such as a motor vehicle) are well known to those skilled in this art and need not be described in additional detail.

In the embodiment according to FIG. 1, the fuel space 6 and the reducing agent space 8 are arranged next to one another with a common wall 4. The latter is preferably a metal with high thermal conductivity to promote heat ransfer between the fuel space and the reducing agent space. This ensures that the fuel F, which is warmer during operation or is heated during a period when the internal combustion engine is being started, can transmit heat to the reducing agent R, to prevent it from freezing or to thaw it out if it has frozen because the engine has not been operated for an extended period and is in a frigid environment.

Figure 2:
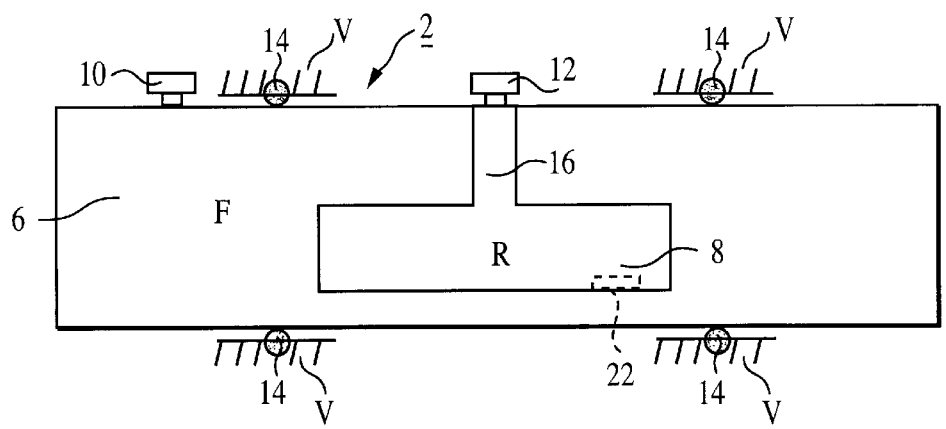
FIG. 2 shows an alternate embodiment of the invention in which a reducing agent tank is disposed within a fuel tank.

FIG. 2 illustrates a second embodiment of a structural unit 2, in which the reducing agent space 8 is suspended substantially wholly within the fuel space 6. The reducing agent space 8 has metal walls in this embodiment. The fuel space 6 and the reducing agent space 8 may be any suitable shapes, including a cylinder or parallelopiped. The reducing agent space 8 is suspended in the fuel space 6 with the aid of a tubular access passage 16, at the end of which is disposed the fill/feed pipe 12.

In the embodiment according to FIG. 2, the arrangement of the reducing agent space substantially wholly within the fuel space 6 enhances good heat transfer between the two spaces. To enhance heat transfer further, at least one, and possibly all, of the walls of the reducing agent space 8 are made of a material, preferably a metal, with high thermal conductivity to promote heat transfer between the fuel space and the reducing agent space.

A heating device 22 associated with the reducing agent space 8 assists in preventing freezing of the reducing agent R, or, if the reducing agent R has frozen, assists in thawing it out again. The heating device 22 may be electric and will be particularly advantageous on a vehicle in which the reducing agent R is an aqueous urea solution.

Figure 3:
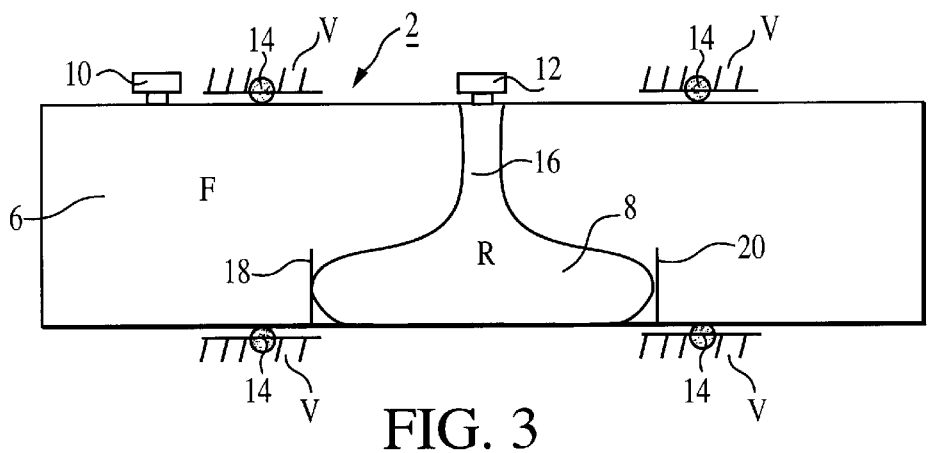
FIG. 3 shows a third embodiment of the invention in which a reducing agent tank is a flexible bladder or pouch within a fuel tank.

FIG. 3 illustrates a third embodiment in which the reducing agent space 8 is disposed substantially wholly within the fuel space 6, as in FIG. 2. In the FIG. 3 embodiment the reducing agent space 6 is formed from a pouch or bladder having flexible walls. The bladder is held approximately in the middle part of the fuel space 6 by two lateral holding walls 18 and 20. As in the FIG. 2 embodiment, the reducing agent space 8 is connected by an access portion 16 to the feed/fill pipe 12 on the top of the structural unit 2. A heating device like that shown in FIG. 2 as heating device 22 can be associated with the reducing agent space 8 for the purposes described above in connection with FIG. 2.

Substantially enveloping the reducing agent space 8 with fuel K according to the embodiments shown in FIGS. 2 and 3 decreases the possibility that the reducing agent will freeze. In a vehicle with a diesel engine, the fuel K is often utilized for cooling engine components by recirculating the fuel, for example, to a feed pump or control unit. The temperature of the recirculated fuel is raised slightly by the heat transferred from the engine components, and thus there is a slight elevation of the temperature of the diesel fuel F in the fuel space 6 during operation. That contributes to raising the temperature in the entire structural unit 2, including the reducing agent space 8. Thus, in addition to the direct heating of the reducing agent R by a heating device 22 as discussed above, the temperature level of the entire contents of the structural unit 2, including the reducing agent R, can be raised by the heat energy in the recirculated diesel fuel F flowing back to the fuel space 6. This not only inhibits freezing of the reducing agent R, which is in solution form, during operation of the diesel engine, but also assists in thawing the reducing agent R if it has frozen during a lengthy period of nonoperation at low ambient temperatures.

The embodiment illustrated in FIG. 3, with a flexible bladder as the reducing agent space 8 for a urea solution or the like, is also advantageous in that it allows for expansion in volume of the reducing agent aqueous solution if it freezes without causing damage to the reducing agent space 8 or other parts of the structural unit 2.

Although preferred embodiments of the invention have been depicted and described, it will be understood that various modifications and changes can be made other than those specifically mentioned above without departing from the spirit and scope of the invention, which is defined solely by the claims that follow.

What is claimed is:

1. A structural unit for holding fuel for an internal combustion engine having an exhaust gas purification system using a reducing agent, said structural unit comprising:
   a fuel space for holding the fuel; and
   a reducing agent space for holding the reducing agent separate from the fuel, said reducing agent space having at least one common wall with said fuel space, wherein said common wall has a predetermined thermal conductivity promoting heat transfer between the fuel space and the reducing agent space.

2. The structural unit of claim 1, further comprising brackets for mounting said structural unit as a whole to a vehicle.

3. The structural unit of claim 1, wherein said fuel space and said reducing agent space are disposed side by side and are separated by said common wall.

4. The structural unit of claim 3, wherein said common wall is made of a metal with a high thermal conductivity.

5. The structural unit of claim 1, wherein said reducing agent space is disposed substantially wholly within said fuel space.

6. The structural unit of claim 5, further comprising a heating device for heating said reducing agent space.

7. The structural unit of claim 5, wherein said reducing agent space is suspended in said fuel space.

8. The structural unit of claim 5, wherein said reducing agent space has rigid walls.

9. The structural unit of claim 8, wherein said rigid walls are made of a metal with a high thermal conductivity.

10. The structural unit of claim 9, further comprising a heating device for heating said reducing agent space.

11. The structural unit of claim 5, wherein said fuel space and said reducing agent space are one of a cylinder or a parallelepiped.

12. The structural unit of claim 5, wherein said reducing agent space has flexible walls.

13. The structural unit of claim 12, wherein said reducing space is a flexible bladder.

14. The structural unit of claim 13, further comprising a heating device for heating said reducing agent space.

15. The structural unit of claim 13, wherein said fuel space includes at least one lateral holding wall for holding said flexible bladder in place in said fuel space.

16. The structural unit of claim 1, wherein said structural unit includes a fuel space feed/fill opening and a reducing agent feed/fill opening.

17. The structural unit of claim 1, further comprising a heating device for heating said reducing agent space.

18. A structural unit for holding fuel for an internal combustion engine having an exhaust gas purification system using an aqueous urea solution as a reducing agent, said structural unit comprising:

a fuel space for holding the fuel; and a reducing agent space for holding the aqueous urea solution, said reducing agent space having at least one common wall with said fuel space, wherein said common wall has a predetermined thermal conductivity promoting heat transfer between the fuel space and the reducing agent space.

19. A diesel engine system comprising:

an internal combustion engine using diesel fuel;

an exhaust gas purification system using a reducing agent; and a structural unit including a fuel space for holding the diesel fuel, and a reducing agent space for holding the reducing agent separate from the diesel fuel, said reducing agent space having at least one common wall with said fuel space, wherein said common wall has a predetermined thermal conductivity promoting heat transfer between the fuel space and the reducing agent space.

20. The diesel engine system of claim 19, further comprising a vehicle mounting said internal combustion engine and said structural unit.

\* \* \* \* \*